Jan. 6, 1953          J. F. STRAITZ          2,624,301
FURNACE WITH HONEYCOMB BAFFLE WALL
Filed Aug. 12, 1949          2 SHEETS—SHEET 1
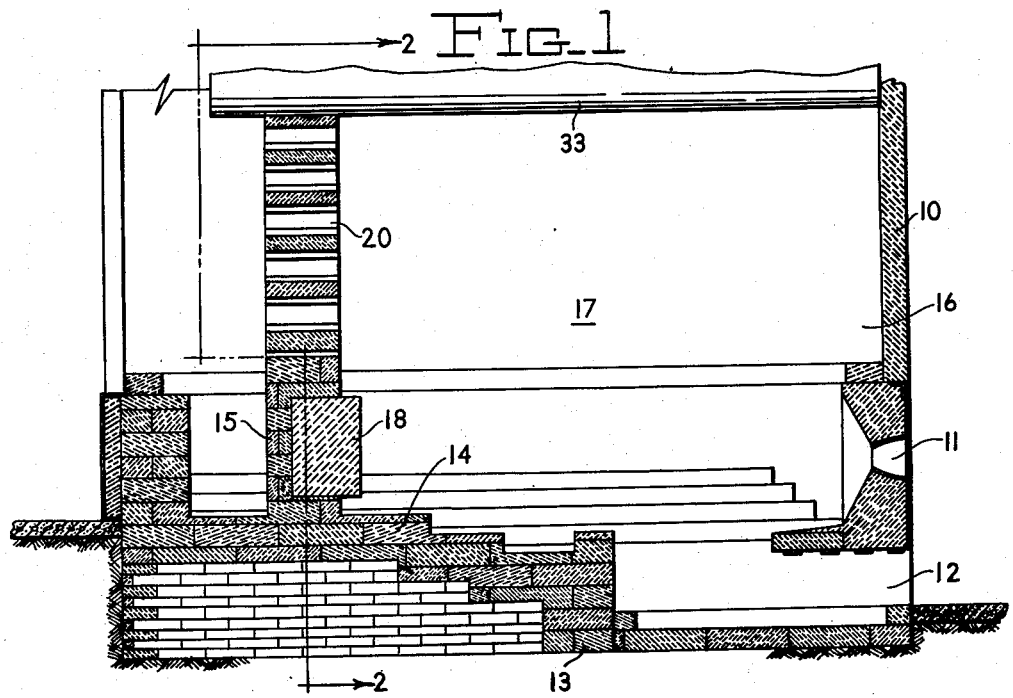
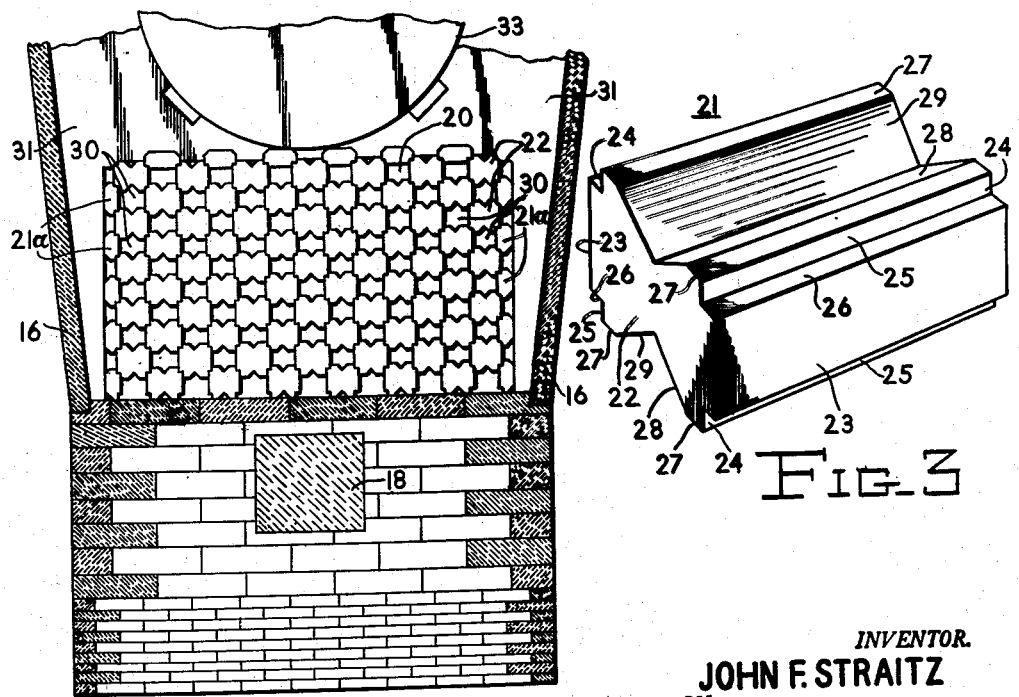
INVENTOR.
JOHN F. STRAITZ
BY
ATTORNEY

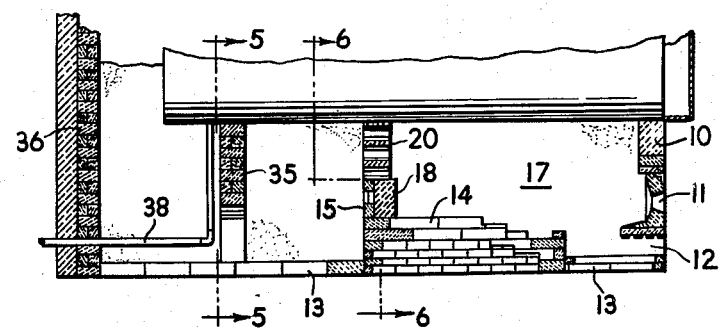
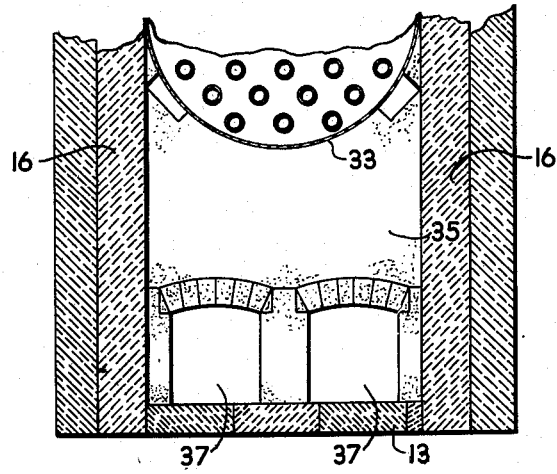
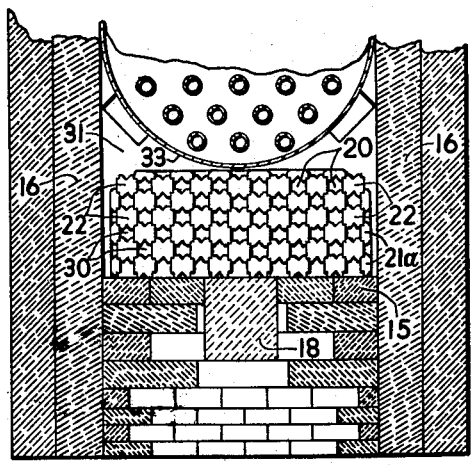

Patented Jan. 6, 1953

2,624,301

UNITED STATES PATENT OFFICE 2,624,301

FURNACE WITH HONEYCOMB BAFFLE WALL

John F. Straitz, Philadelphia, Pa., assignor to National Airoil Burner Company, Incorporated, Philadelphia, Pa., a corporation of Delaware Application August 12, 1949, Serial No. 109,837

3 Claims. (Cl. 110—92)

This invention relates to furnaces and more particularly to the provision in a furnace of a bridge wall of ceramic material provided with a plurality of openings or apertures for improving the character of combustion in the furnace.

It is the principal object of the present invention to provide an improved furnace construction which includes a bridge wall of honeycomb construction for retarding the passage of the furnace gases and improving the character of combustion.

It is a further object of the present invention to provide an improved furnace having a bridge wall of honeycomb construction and of ceramic material which is capable of heat absorption and retention thereby increasing the operating temperature in the furnace chamber.

It is a further object of the present invention to provide an improved furnace having a bridge wall which has a retarding effect on the combustion gases thus eliminating pulsations in the flame and aiding in more complete combustion.

It is a further object of the present invention to provide a furnace having an improved bridge wall which will decrease the time required for warming up in starting.

It is a further object of the present invention to provide a furnace having an improved bridge wall which by its effect on combustion will prevent carry-over of unburned combustible thereby improving combustion and obviating the discharge from the stack of soot, carbon, or materials having objectionable odors.

It is a further object of the present invention to provide an improved furnace construction having a bridge wall of inherently self-sustaining character and which may be assembled without the necessity for employing cement, mortar or other binders.

Other objects and advantageous features of the invention will be apparent from the specification and claims.

The nature and characteristic features of the invention will be more readily understood from the following description, taken in connection with the accompanying drawings forming part hereof, in which:

Figure 1 is a fragmentary vertical central sectional view through a furnace in accordance with the present invention;

Fig. 2 is a transverse sectional view taken approximately on the line 2—2 of Fig. 1;

Fig. 3 is a view in perspective of a preferred form of block or tile employed in connection with the present invention;

Fig. 4 is a fragmentary vertical sectional view through another form of furnace in accordance with the present invention;

Fig. 5 is a transverse vertical sectional view, enlarged, taken approximately on the line 5—5 of Fig. 4; and Fig. 6 is a transverse vertical sectional view, enlarged, taken approximately on the line 6—6 of Fig. 4.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a preferred form of furnace is therein illustrated. The furnace includes a vertical front wall 10, which preferably has formed therein a fuel inlet opening 11 for the introduction of the fuel for combustion. While any desired type of fuel may be employed, such as gas, coal, and the like, introduced in any preferred manner, the furnace of the present invention is particularly suited for oil supplied through a rotary burner.

The front wall 10 may be provided with an air inlet opening 12 for the delivery of air in any desired manner for combustion.

The furnace is also provided with a bottom wall or floor 13, and spaced rearwardly from the front wall 10, an elevated floor section 14 is provided for supporting the bridge wall 15 in accordance with the present invention.

The furnace has spaced side walls 16 which extend upwardly from the floor 13 to the top wall (not shown). A furnace chamber 17 is thus provided between the front wall 10 and the bridge wall 15 and between the side walls 16.

At the lower portion of the bridge wall 15, if desired, and if oil is employed as fuel, a target block 18 may be provided of suitable refractory material.

Extending upwardly from the bottom wall or floor 13 and above the target block 18 a bridge wall section 20 is interposed of particular shape and characteristics.

The bridge wall section 20 is preferably constructed from a plurality of blocks or tiles 21 of heat resistant ceramic material and of the character illustrated particularly in Fig. 3.

Referring to Fig. 3, it will be noted that each of the tiles or blocks 21 preferably includes a pair of parallel ends 22 and a pair of parallel sides 23 with grooves 24 formed at the upper and lower terminals of each of the sides 23. The grooves 24 are bounded by faces 25 parallel to the sides 23 and by faces 26 perpendicular to the faces 25 and to the sides 23.

The tiles or blocks 21, at the top and bottom thereof, preferably have spaced flat sections 27 with inclined meeting faces 28 and 29 disposed in flattened V configuration. The disposition of the faces 28 and 29 provides upper and lower passageways from end to end of the blocks 21.

The blocks 21 are preferably mounted in assembled relation to provide the wall section 21, as illustrated in Figs. 1 and 2, with their ends 22 vertically disposed.

A honeycomb wall section is thus provided with a plurality of rows of spaced openings 30, the openings 30 in one row being in staggered relation to the openings 30 in the rows thereabove and therebelow.

The end portions of the wall may be constructed of half blocks or tiles 21a as illustrated in Fig. 2.

The spaces beyond and above the honeycomb section 20 of the bridge wall 15 are preferably filled with suitable ceramic brick or tile as at 31, which preferably extends to the side walls 16, and to the crown sheet 33 of the boiler with which the furnace is employed.

Referring now more particularly to Figs. 4, 5 and 6, in the furnace therein illustrated a french wall 35 is provided to the rear of the bridge wall 15 and forwardly of the rear wall 36. The wall 35 is made of refractory material, may provide a support for the crown sheet or drum 33 of a horizontal return tubular boiler, and has spaced openings 37 therethrough extending upwardly from the floor 13. The feed water supply pipe 38 for the boiler may extend through the rear wall 36 and upwardly and into the drum 33 to the rear of the wall 35.

The mode of operation will now be pointed out.

Fuel is introduced through the fuel inlet opening 11 and air is introduced through the air inlet opening 12 for combustion in the furnace chamber 17. As the fuel burns in the chamber 17, a portion of the heat is absorbed by the crown sheet 33 and by the bridge wall 15. The bridge wall 15 is thus heated and retains heat. The products of combustion and burning fuel, in order to leave the chamber 17, pass through the openings 30 in the wall section 20 where the heat in the wall tends to aid in the combustion of any combustible material carried in the gases.

The wall 15, with its openings 30, also functions as an obstruction to the free passage of the products of combustion from the chamber 17, thereby reducing any tendency to fluctuation in pressure in the chamber 17, and provide for a smoother flow of gas beyond the wall section 20 for subsequent heat absorption.

The character of combustion in the chamber 17 is improved by the retarding effect of the wall section 20 which by its high temperature, also tends to aid in the burning of portions of the fuel which may be slow in igniting.

With the furnace shown in Figs. 4, 5 and 6, in addition to the flow restrictive action of the wall 15, the gases of combustion are directed in a more circuitous path. After their passage through the openings 30 in the wall 15 the gases pass downwardly, through the openings 37 and then upwardly to and through the drum 33.

I claim:

1. In a furnace having a front wall, a bottom wall, and spaced side walls, a bridge wall rearwardly disposed with respect to said front wall and enclosing with said other walls a combustion space, said bridge wall comprising a section of spaced solid blocks of ceramic material disposed in vertical columns, the blocks in adjoining columns being disposed in offset relation, each of said blocks having opposed pairs of vertical and horizontal boundary surfaces, each of said blocks having inset faces at the junction of said boundary surfaces providing edge grooves for engagement respectively with a face and a boundary surface of a contiguous block, the boundary surfaces of one of said pairs having grooves therealong from the front to the rear thereof providing passageways.

2. In a furnace having a front wall, a bottom wall, and a spaced side walls, a bridge wall rearwardly disposed with respect to said front wall and enclosing with said other walls a combustion space, said bridge wall comprising a section of spaced solid blocks of ceramic material in vertical columns, each of said blocks having opposed pairs of vertical and horizontal boundary surfaces, each of said blocks having angularly disposed faces at the junction of said boundary surfaces providing edge grooves for engagement respectively with a face and a boundary surface of a contiguous block, whereby the vertical boundary surfaces in vertical columns are in alinement in each column and the vertical boundary surfaces of one column are offset with respect to the vertical boundary surfaces of the adjoining column, the boundary surfaces of the horizontal pairs having grooves therein from the front to the rear thereof providing passageways.

3. In a furnace having a front wall, a bottom wall, and spaced side walls, a bridge wall rearwardly disposed with respect to said front wall and enclosing with said other walls a combustion space, said bridge wall comprising a section of spaced solid blocks in vertical columns, each of said blocks having opposed pairs of vertical and horizontal boundary surfaces, the horizontal boundary surfaces having V-shaped longitudinal passageways therealong, each of said blocks having angularly disposed faces at the junction of said boundary surfaces providing edge grooves for engagement respectively with a face and a boundary surface of a contiguous block, whereby the vertical boundary surfaces in vertical columns are in alinement in each column and the vertical boundary surfaces of one column are offset with respect to the vertical boundary surfaces of the adjoining column.

JOHN F. STRAITZ.

REFERENCES CITED

The following references are of record in the file of this patent:

UNITED STATES PATENTS

| Number | Name | Date |
|---|---|---|
| 123,882 | Fox | Feb. 20, 1872 |
| 452,344 | Farwell | May 12, 1891 |
| 755,077 | Thompson | Mar. 22, 1904 |
| 1,080,368 | Reagan | Dec. 2, 1913 |
| 1,362,789 | Hamilton | Dec. 21, 1920 |
| 1,485,967 | Duncan | Mar. 4, 1924 |
| 1,588,270 | Rudolf | June 8, 1926 |
| 1,986,737 | McGee | Jan. 1, 1935 |
| 2,096,586 | Johnson | Oct. 19, 1937 |
| 2,221,416 | Tau | Nov. 12, 1940 |
| 2,482,215 | Russell | Sept. 20, 1949 |